United States Patent Office 3,480,479
Patented Nov. 25, 1969

3,480,479
FUEL CELL AND PROCESS USING MOLYBDENUM OXIDE AND TUNGSTEN DISULFIDE CATALYST
James F. Nestor, Wilmington, Del., assignor to E. I. du Pont de Nemours and Company, Wilmington, Del., a corporation of Delaware
No Drawing. Filed Nov. 1, 1967, Ser. No. 679,629
Int. Cl. H01m 27/04
U.S. Cl. 136—86                                    10 Claims

ABSTRACT OF THE DISCLOSURE

A relatively inexpensive catalyst for a fuel cell electrode, particularly useful with acid electrolytes, is an acid-insoluble solid material composed of 10–99 weight percent of at least one oxide of molybdenum and, correspondingly, 1–90 weight percent of tungsten disulfide ($WS_2$), said oxide of molybdenum having the formula $MoO_x$, wherein $x$ has a value of 2–2.88, at least the exposed regions of said solid material containing said sulfide of tungsten.

RELATED APPLICATIONS

The following applications are referred to in this specification: Ser. No. 348,165, filed Feb. 28, 1964; Ser. No. 609,776, filed Jan. 17, 1967; and Ser. No. 639,515, filed May 18, 1967, now abandoned.

SUMMARY OF INVENTION

A fuel cell electrode having as a catalyst an acid-insoluble solid material composed of 10–99 weight percent of at least one oxide of molybdenum and 1–90 weight percent of tungsten disulfide, said oxide of molybdenum having the formula $MoO_x$, wherein $x$ has a value of 2–2.88, at least the exposed regions of said solid material containing said sulfide of tungsten.

This invention relates to improved fuel cells and, more particularly, the invention relates to the anodes used in fuel cells.

Fuel cell, as used herein, refers to a device capable of generating electrical energy from the oxidation of a fuel. Specifically, a fuel cell comprises a housing, two electrically conductive electrodes consisting of or impregnated with catalytic material, connecting means associated with each electrode for establishing electrical contact with an external circuit and an electrolyte which acts as a transferring medium for ions. An oxidizing gas such as air is supplied to the oxidant electrode (the cathode); and a fuel, such as hydrogen, methanol, formaldehyde, etc. is supplied to the fuel electrode (the anode). At the cathode, electrons are consumed to convert the oxidant into ions; and at the anode, the fuel is oxidized with the release of electrons. There is, therefore, a net flow of electrons from the anode to the cathode through the external electrical-conductive circuit. If the electrolyte is alkaline, then negative ions migrate to the anode to take part in the oxidation reaction. If the electrolyte is acid, then positive ions migrate to the cathode to take part in the reduction reaction.

Heretofore, the most successful anodes for use in fuel cells have either been formed of very expensive materials or have contained such materials as catalysts. Platinum, palladium, rhodium, silver and compounds of such materials have been used as anode catalysts and have tended to make the fuel cell commercially unattractive. Although less expensive materials have been suggested, none has provided sufficiently low cost per unit power, particularly for use with the more desirable acid electrolytes, to compete with platinum and the like for use as anodic catalysts in fuel cells.

In its broadest sense, the present invention provides a fuel cell in which the anode catalyst is an acid-insoluble solid material (substantially insoluble in a 15 percent aqueous solution of hydrochloric acid at a temperature of 90° C.) composed of 10–99 weight percent, preferably 10–90 percent; of at least one oxide of molybdenum and 1–90 weight percent, preferably 10–90 percent, of the disulfide of tungsten, the oxide having the formula $MoO_x$, wherein $x$ has a value of 2–2.88, and wherein at least the exposed regions of the solid material contain the disulfide of tungsten.

Locating the tungsten disulfide of the catalyst in the regions of the solid material that are exposed to (in contact with) the electrolyte is important in the operability of the catalyst. Thus, it should be present as a coating or layer on the oxide of molybdenum so that it is distinguishable, microscopically or analytically, from the interior of the solid material. There must be such intimacy between the outer and the inner layers that would facilitate the conduction of the electrons between the regions. Simple mixtures of molybdenum oxide particles and tungsten disulfide particles are operable as a catalyst in this invention but such mixtures are not preferred since there exists resistance to electrical conduction at the interfaces of the particles.

The catalyst can be composed of individual particles of the acid-insoluble solid material, as defined previously, so that each particle is catalytically active. Alternatively, the catalyst can be a relatively large sheet of the oxide of molybdenum having the tungsten disulfide in its outer layer. This latter structure provides the minimum sulfur content that can be present in the catalyst. In a sheet of the oxide having a monomolecular outer region of the disulfide over a molybdenum dioxide sheet, the sulfur content would be about 0.4 weight percent which corresponds to an oxide:disulfide ratio of 99:1. The maximum sulfur content would occur in tiny platelets of the oxide of molybdenum in which the outer regions are predominantly, but not completely coated with the disulfide. In this latter case, the catalyst would be operable in the present invention and the oxide:disulfide ratio would be in excess of 1:9.

CATALYST PREPARATION

Generally, any method for incorporating oxides with sulfides is suitable for the preparation of the catalyst used in this invention. One method involves treating a suspension of the oxide with a solution of the sulfide to yield the insoluble product. Where the oxide of molybdenum is used as a starting material in the preparation of the catalyst, it can be the stoichiometric oxide ($MoO_2$) or non-stoichiometric oxides ($Mo_4O_{11}$, $Mo_8O_{23}$, $Mo_9O_{26}$, etc.). However, the formulation of the oxide of molybdenum in the final product will range from $MoO_2$ to $Mo_8O_{23}$, i.e., $MoO_x$ where $x$ is 2–2.88.

A preferred method for preparing the catalytic material involves intimately mixing the oxide of molybdenum with tungsten disulfide. Milling the oxide and the disulfide with large (½ inch) ceramic balls produces sufficiently high energy to yield an operable catalyst. Simple mixing by hand or by tumbling the materials in a drum also produces material that is operable as a catalyst. Sheets of the oxide may be coated with a thin layer of the disulfide by vapor deposition or other methods so that the exposed regions of the sheet are sulfurated. It is also possible to produce the sheets by compressing previously produced particles of the catalytic material.

Where particles of the acid-insoluble solid material, as defined previously, are produced, such particles will range in size from one to ten microns. However, the invention is not so limited since smaller and larger particles will also form active catalysts. It should also be pointed out that size reduction after the catalyst has been formed is not desirable. Grinding or milling the acid-insoluble solid material tends to change the sulfide distribution in the particle and may relocate the sulfurated regions inwardly.

ANODE PREPARATION

The anode of this invention is preferably composed of a base stratum that is usually an electrically conductive material, chemically resistant to the electrolyte, which supports the previously described catalytic material. Although any electrically conductive material including gold and those metals of Group VIII of the Periodic Table that are resistant to the electrolyte would be operable, it is preferred to use materials that are relatively inexpensive in order to retain the basic advantages of the catalyst. Thus, some transition metals, like tungsten and tantalum, may be used as such or in alloys thereof, e.g., stainless steel, nickel-aluminum alloys, etc. In addition, suitable electrodes may be formed from metal oxides, carbon, carbides, conductive ceramics, conductive polymeric compositions or the metal/silicon combinations disclosed in U.S. Patent 3,297,487. The electrode base stratum may be used in sheet, rod or cylinder form or, preferably, in the form of a porous or foraminus base, e.g., screen, mesh, wool, etc. to provide maximum surface area.

The catalytic material may be incorporated in a binder and the combination may be applied to the electrically conductive base stratum under pressure. As the binder material, such polymers as chlorinated butyl rubber, polystyrene, polymethyl methacrylate, polyethylene terephthalate, polyvinyl chloride, polyvinyl fluoride, polytetrafluoroethylene and other fluorocarbon polymers, polyurethanes, polybutadiene, polyisoprene, polyamides, polyimides, chlorosulfonated polyethylene, chlorinated polyethylenes, and the like may be used.

In the most desirable system, the catalytic material is used as part of a bipolar conductor system. Bipolar conductor systems offer the following advantages: the fuel cell design is simplified; the construction can be compact; and external cell connection losses are minimized. These advantages are discussed in 15th Annual Power Sources Conference Proceedings, 1961; pp. 31–32 of "Liquid Alkaline Fuel Cells" by P. G. Grimes et al. The bipolar electrode may be formed from the materials useful in the present invention by depositing the catalytic material on a support of porous graphite or carbon or the like, the supporting material acting as one side (the anode) of a conductor while the reverse side acts as the cathode.

It should be understood, however, that it is not necessary that the catalytic material be incorporated with the electrode. Particles of the catalytic material may be suspended in the anolyte (the electrolyte in contact with the anode) as described in U.S. patent application Ser. No. 348,165, filed Feb. 28, 1964. Alternatively, the catalytic material, being electrically conductive, can be used as the electrode itself. Specifically, it can be pressed, with or without a polymeric binder, into a form for receiving an electrical lead; or it can be used in particulate form in a gas dispersion tube.

ELECTROLYTES

The electrolytes used in the fuel cells and half cells of this invention can be any of those commonly used which are compatable with the particular fuels, oxidants, permeable membranes, etc. being used. They will usually be aqueous mixtures of adequate conductivity for the ions involved in the half cell reactions. The useful aqueous electrolytes include solutions of the alkali metal hydroxides, e.g., potassium hydroxide, sodium hydroxide; the common acids, e.g., sulfuric acid, phosphoric acid, hydrochloric acid; alkaline salts, e.g., the chlorides, sulfates or carbonates of sodium, potassium or lithium; etc. The concentrations involved will usually be chosen for high conductivity and convenient handling. For the purpose of the present invention, acidic electrolytes are preferred. In such electrolytes, gaseous waste products are produced which are readily removed. Specifically, 5–45% sulfuric acid, 10–85% phosphoric acid and 5–15% hydrochloric acid are recommended. When formaldehyde is used as the fuel, a preferred anolyte comprises 20–30% formaldehyde, 2–7% hydrochloric acid, and the remainder being water.

While it will usually be desirable to use the same electrolyte for the fuel and oxidant half cells in the fuel cell arrangements of this invention, the use of a common electrolyte is not essential. Two different electrolytes can be used by incorporating in the fuel cell design a suitable membrane which separates the electrolytes but permits adequate flow of ions between the half cells. A preferred class of ion-exchange membranes for use in the fuel cell of this invention are thin films of fluorinated copolymers having pendant sulfonic acid groups, preferably the copolymers of trifluorovinyl sulfonic acid and fluorinated ethylenes, as disclosed in copending U.S. patent application Ser. No. 639,515, filed May 18, 1967. By using a suitable ion-permeable membrane, one half cell can utilize a soluble fuel or oxidant in one electrolyte while the other half cell utilizes a gaseous or liquid fuel or oxidant, the membrance serving to prevent migraton of the soluble fuel or oxidant to the other electrode.

FUELS AND OXIDANTS

While the catalysts described herein are particularly useful with low molecular weight hydrogenous fuels, the invention is not so limited. Besides hydrogen, the useful fuels include nitrogen-containing fuels like ammonia and hydrazine; oxygenated hydrocarbon fuels like formaldehyde, methanol, formic acid, and carbon monoxide. The fuel may consist of one or more of the foregoing materials. For example, natural gas, which is a mixture of hydrogen and methane, and reformed natural gas, which is a mixture of hydrogen, methane and carbon monoxide, are useful fuels. The selection of the particular fuel to be used will depend upon its availability and its degree and ease of oxidation in the presence of the particular electrolyte. In any event, the fuel should not react directly with the electrolyte or with the materials of cell construction.

The oxidizing agents that can be used are preferably air and pure oxygen. Other oxidants which might be considered include a nitrogen oxide such as nitric oxide or nitrogen dioxide, sulfur dioxide, chlorine, liquid hydrogen peroxide, liquid organic peroxides, nitric acid, etc. As with the fuels, some of these oxidants will be more useful with particular electrolytes and cathode catalysts than with others.

It may be advantageous to use some of these oxidants in conjunction with a reducible salt dissolved in the electrolyte. A preferred system employing oxygen as the oxidant and cupric chloride dissolved in a hydrochloric acid electrolyte is disclosed in U.S. patent application Ser. No. 609,776, filed Jan. 17, 1967.

CATHODES

The cathode should be an electrical conductor which will accept electrons and will provide a surface for the electrode reaction with or without the presence of a catalyst. Suitable electrodes meeting these requirements are well known and many are described for example in "Catalysis, Inorganic and Organic," Berkman, Morrel, and Egloff, Reinhold Publishing Co., New York (1940). Suitable electrode materials include electrodes formed from metals of Group VIII of the Periodic Table such as rhodium, palladium, iridium and platinum. In addition to the electrodes formed from these metals, the electrodes can be formed from platium or palladium black which is deposited on a base metal such as stainless steel, iron, nickel and the like. In addition, suitable electrodes may be formed from the metal-silicon combination described in U.S. Patent 3,297,487 or from metal oxides or from carbon which is activated with platinum or palladium. The preferred cathode materials for use with the previously disclosed cupric chloride-hydrochloric acid catholyte systems are those relatively inexpensive materials disclosed with reference to the anodes, e.g., tantalum, carbon, etc.

The electrode materials may be used in sheet form or in the form of screens, meshes, or porous metals. They may be combinations of solid electrodes coated with porous catalysts bound with organic materials and plastics. It is also possible to use a combination cathode and solid oxidant. For example, the lead dioxide plate such as used in a storage battery may be used in the fuel cell of the invention; or, at least as a means for testing the effectiveness of fuels in the presence of the anodes and catalysts of the invention.

The temperature of operation of the fuel cell can range from about 20° C. to about 150° C., the pressure being atmospheric or slightly above to raise the boiling point of the electrolyte. In general, more current can be drawn from a fuel cell at a constant potential when the temperature is increased. However, at temperatures above about 150° C. the corrosive action of the acidic electrolyte on metals in the fuel cell is accelerated.

Water generated by the electrochemical reactions should be removed to avoid undue dilution. This can be conveniently done at a temperature above 100° C. by having the entire cell attached to a condenser which selectively removes the proper amount of water.

The invention will be more clearly understood by referring to the examples which follow. These examples should not be considered to limit the invention in any way. Parts and percentages in the examples are by weight, unless otherwise stated.

EXAMPLES 1–4

A series of catalyst compositions were prepared by tumbling commercially available tungsten disulfide powder with molybdenum dioxide powder in an 8 oz. round bottle for 12 hours. Two gram portions of these compositions were blended with 0.2 gram of polytetrafluoroethylene resin and pressed at 60,000 lbs. onto a circle of tantalum 200 mesh screen measuring one inch in diameter to which was spot welded a 4 inch lead of 20 mil tantalum wire. These electrodes were then used in the anode compartment of a standard two compartment glass fuel cell laboratory model containing as the anolyte, an aqueous solution containing 18.5% formaldehyde and 5% sulfuric acid heated to a temperature of 85° C. The cathode was composed of a standard lead oxide electrode in a 10% sulfuric acid solution. The anode and cathode compartments were separated by a proton exchange membrane (sold by American Machine and Foundry Corp. as AMF type C–310). The following current densities were obtained at an anode potential of 0.3 volt (versus the saturated calomel electrode):

| Example | Catalyst composition | | Current density (amperes/sq. ft.) |
|---|---|---|---|
| | $WS_2$ (weight percent) | $MoO_2$ (weight percent) | |
| Control | 100 | 0 | 0.2 |
| 1 | 80 | 20 | 15 |
| 2 | 60 | 40 | 39 |
| 3 | 20 | 80 | 55 |
| 4 | 10 | 90 | 50 |
| Control | 0 | 100 | 0 |

EXAMPLES 5–9

A series of electrodes were made according to the procedure described in Example 1. A composition containing 2 grams of the sulfide-oxide catalyst and 4 grams of tantalum fibers (⅛ inch in length) was incorporated into the 1 inch diameter tantalum screen recited in Example 1. The anolyte was an aqueous solution of 23.7% formaldehyde and 4.1% hydrochloric acid. The cathode compartment contained a mixture of 23% cupric chloride in 3% hydrochloric acid, into which was bubbled pure oxygen.

The following current densities were obtained at an anode potential of 0.3 volt (versus the saturated calomel electrode) at 85° C.:

| Example | Catalyst composition | | Current density (amperes/sq. ft.) |
|---|---|---|---|
| | $WS_2$ (weight percent) | $MoO_2$ (weight percent) | |
| Control | 100 | 0 | 0.3 |
| 5 | 90 | 10 | 21 |
| 6 | 80 | 20 | 37 |
| 7 | 60 | 40 | 26 |
| 8 | 40 | 60 | 32 |
| 9 | 10 | 90 | 40 |

EXAMPLES 10–13

A series of catalyst compositions were made by ball milling tungsten disulfide with molybdenum dioxide powder for 12 hours in an argon atmosphere using ½-inch diameter ceramic balls. Two grams of these catalysts were compounded with 3 grams of tantalum wool fibers and 0.2 gram of polytetrafluoroethylene resin and pressed onto a 1 inch diameter tantalum screen using a pressure of 60,000 lbs. The anolyte and catholyte systems were as described in Example 1.

The following current densities were obtained at an anode potential of 0.3 volt (versus the saturated calomel electrode):

| Example | Catalyst composition | | Current density (amperes/sq. ft.) |
|---|---|---|---|
| | $WS_2$ (weight percent) | $MoO_2$ (weight percent) | |
| Control | 100 | 0 | 0.3 |
| 10 | 90 | 10 | 28 |
| 11 | 67 | 33 | 51 |
| 12 | 50 | 50 | 62 |
| 13 | 20 | 80 | 60 |
| Control | 0 | 100 | 0 |

EXAMPLES 14–17

Employing catalysts made according to Examples 10–13 and the anolyte-catholyte system described in Examples 5–9, the following current densities were obtained at an anode potential of 0.3 volt (versus the saturated calomel electrode):

| Example | Catalyst composition | | Current density (amperes/sq. ft.) |
|---|---|---|---|
| | $WS_2$ (weight percent) | $MoO_2$ (weight percent) | |
| Control | 100 | 0 | 0.3 |
| 14 | 90 | 10 | 37.5 |
| 15 | 60 | 40 | 37.5 |
| 16 | 40 | 60 | 37.5 |
| 17 | 10 | 90 | 26 |
| Control | 0 | 100 | 0 |

EXAMPLE 18

A mixture of 44 grams of $Mo_4O_{11}$ and 20 grams of tungstend disulfide were ball milled in a ceramic mill for a period of 14 hours and fabricated into an electrode and tested as described for Examples 1–4. The following results were obtained.

| Current density (milli-amperes/sq. cms.): | Anode potential vs. saturated calomel electrode (volts) |
|---|---|
| 5.0 | 0.12 |
| 8.1 | 0.40 |

EXAMPLE 19

Tungsten disulfide powder (33 weight percent) and molybdenum dioxide powder (67 weight percent) were ball milled for 5 hours in a ceramic mill. 4.2 grams of the milled product were mixed with 0.6 gram of a polyimide powder and pressed onto a tantalum screen using 75,000 p.s.i. to form the electrode.

The electrode was operated as an anode in a fuel cell using lead dioxide as both oxidant and cathode. The electrolyte was an aqueous solution containing 10 weight percent sulfuric acid. The anode was evaluated by comparing its activity in the absence of a fuel to its activity when formaldehyde was used as the fuel at the anode.

The results are presented in the following table:

| Current density (milliamperes/sq. cm.) | Anode potential vs. saturated calomel electrode (volts) | |
|---|---|---|
| | No fuel | Formaldehyde |
| Open circuit | +0.14 | −0.15 |
| 1 | +0.16 | −0.05 |
| 5 | +0.24 | +0.04 |
| 10 | +0.34 | +0.20 |

The decrease in open circuit voltage and the lowered anode-reference potential with respect to the saturated calomel electrode when fuel is used are indicative of catalytic activity.

EXAMPLE 20

Two grams of the milled product of Example 19 were mixed with one gram of 1/16 inch to 1/8 inch lengths of tantalum wool and 0.2 gram of polytetrafluoroethylene resin. The mixture was pressed onto a 1 inch diameter tantalum screen to which a tantalum lead wire had been spot welded to form the electrode.

The electrode was operated as an anode in a fuel cell using lead dioxide as both oxidant and cathode. The electrolyte was an aqueous solution containing 10 weight percent sulfuric acid. The anode was evaluated by comparing its activity in the absence of a fuel to its activity when formaldehyde was used as the fuel at the anode.

The results are presented in the following table:

| Current (milliamperes) | Anode potential vs. saturated calomel electrode (volts) | |
|---|---|---|
| | No fuel | Formaldehyde |
| Open circuit | +0.14 | −0.08 |
| 20 | +0.17 | −0.05 |
| 50 | +0.19 | 0 |
| 100 | +0.20 | +0.05 |
| 150 | +0.22 | +0.15 |

EXAMPLE 21

A catalyst was made by tumbling for 12 hours a mixture containing 60 weight percent tungsten disulfide and 40 weight percent molybdenum dioxide. Two grams of this mixture were blended with 1.5 grams tantalum wool fibers 1/8 inch–1/4 inch in length and 0.2 gram polytetrafluoroethylene resin. A porous anode was made from the blend by pressing it at 6000 pounds total pressure onto a 1 inch diameter tantalum screen having a lead wire attached. The electrode was placed into a polytetrafluoroethylene holder and immersed into a 2.5 normal solution of hydrochloric acid at 85° C. Helium and hydrogen were passed through the electrode at pressures ranging from 2–5 p.s.i.g. The cell was driven using a standard laboratory module with an external power supply to obtain current.

The results are presented in the following table:

| Current (milliamperes) | Anode potential vs. saturated calomel electrode (volts) | |
|---|---|---|
| | Helium | Hydrogen |
| 0 | +0.3 | −0.13 |
| 30 | +0.35 | −0.01 |
| 60 | +0.45 | +0.16 |
| 90 | | +0.39 |

What is claimed is:

1. In a fuel cell comprising a housing, at least one fuel electrode, catalytic material associated with at least said fuel electrode, at least one oxidant electrode, at least one electrolyte, and connecting means associated with at least one fuel electrode and at least one oxidant electrode for establishing electrical contact with an external circuit, the improvement wherein the catalytic material associated with the fuel electrode is an acid-insoluble solid material composed of 10–99 weight percent of at least one oxide of molybdenum and 1–90 weight percent of tungsten disulfide, said oxide having the formula $MoO_x$, wherein $x$ has a value of 2–2.88, at least the exposed regions of said solid material containing said tungsten disulfide.

2. A fuel cell as in claim 1 wherein said catalytic material is composed of 10–90 weight percent of said oxides of molybdenum and 10–90 weight percent of tungsten disulfide.

3. A fuel cell as in claim 1 wherein said catalytic material is associated with an electrically conductive base stratum.

4. A fuel cell as in claim 3 wherein said base stratum is a transition metal.

5. A fuel cell as in claim 3 wherein said base stratum is tantalum.

6. A fuel cell as in claim 2 wherein said oxide of molybdenum is molybdenum dioxide.

7. A fuel cell as in claim 1 wherein said electrolyte is an acidic electrolyte.

8. In a process for producing electric current which comprises passing an oxidant into an electrolyte in proximity to a first electrode surface, said first electrode surface being at least partially submerged in said electrolyte and having associated therewith means for reducing said oxidant in the presence of said electrolyte; passing a fuel into an electrolyte in proximity to a second electrode surface, said second electrode surface being partially submerged in said electrolyte and having associated therewith a catalyst for oxidizing said fuel in the presence of said electrolyte; and providing the submerged portions of said electrodes with conductive means to an external electrical circuit to provide an electric current in said external circuit, the improvement wherein the catalyst associated with said second electrode surface is an acid-insoluble solid material composed of 10–99 weight percent of at least one oxide of molybdenum, said oxide having the formula $MoO_x$, wherein $x$ has a value of 2–2.88, and 1–90 weight percent of tungsten disulfide, at least the exposed regions of said solid material containing said tungsten disulfide.

9. A process as in claim 8 wherein said catalytic solid material is composed of 10–90 weight percent of said oxide of molybdenum and 10–90 weight percent of tungsten disulfide.

10. A process as in claim 8 wherein said fuel is selected from the group consisting of hydrogen and formaldehyde.

References Cited

UNITED STATES PATENTS

| 2,320,253 | 5/1943 | Arnold | 252—467 X |
| 2,635,119 | 4/1953 | Finch et al. | 252—439 X |
| 3,129,253 | 4/1964 | Odiso et al. | 252—439 X |
| 3,324,045 | 6/1967 | Mason | 252—439 |
| 3,364,072 | 1/1968 | Barber | 136—86 |
| 3,393,100 | 7/1968 | Niedrach. | |

FOREIGN PATENTS 900,451   7/1962   Great Britain.

ALLEN B. CURTIS, Primary Examiner

U.S. Cl. X.R.

252—439